United States Patent
Taylor

[15] 3,692,319
[45] Sept. 19, 1972

[54] ROTARY TOOL DRIVE MEMBER
[72] Inventor: Cecil Isaac Taylor, 23 Poplars Rd., Buckingham, England
[22] Filed: Jan. 19, 1971
[21] Appl. No.: 107,664

[52] U.S. Cl. .................................. 279/1 C, 287/119
[51] Int. Cl. ............................................. B23b 31/14
[58] Field of Search .... 192/105 BA, 105 CF; 279/76, 279/1 C; 287/119

[56] References Cited

UNITED STATES PATENTS

| | | | |
|---|---|---|---|
| 3,573,876 | 4/1971 | Powell | 287/119 R |
| 2,367,863 | 1/1945 | Grey | 279/1 C |
| 2,634,370 | 4/1953 | Carlson | 192/105 BA |
| 885,392 | 4/1908 | Spets | 279/76 |

*Primary Examiner*—Andrew V. Kundrat
*Attorney*—Berman, Davidson and Berman

[57] ABSTRACT

A rotary tool drive member for laps or like tools having opposite flats formed on their shanks in which two opposed tool drive elements are carried in a groove formed in a rotatable circular block, each tool drive element having a tool engaging surface on one side of the rotational axis and a centrifugal weight on the other side of the rotational axis, and springs urge the centrifugal weights towards the axis, the tool engaging surfaces being separated to the maximum extent when the tool drive member is stationary and being moved towards each other to engage the flats on a tool when the centrifugal weights move apart under the influence of centrifugal force during rotation.

3 Claims, 6 Drawing Figures

Inventor
CECIL I. TAYLOR,

By
Berman, Davidson & Berman, Attorneys.

ROTARY TOOL DRIVE MEMBER

This invention relates to a new or improved rotary member for holding and driving a lap or like tool in a machine, particularly for machining or reconditioning the seats of diesel atomizers, injectors, mozzles or the like, the said member being adapted automatically to engage with the tool shank at the commencement of a machining operation and automatically to disengage from the said shank at the end of the said operation. The said member will hereinafter be referred to as a "tool drive member."

Centrifugal clutches are known in which three gripping elements are employed, designed to grip round bar or round stems on components, the gripping elements being pivoted and provided with centrifugal weights and so arranged that when the machine containing the clutch is started the gripping elements grip the bar or stem due to the movement of the weights under the action of centrifugal force. The bar or stem is released manually at the end of the operation after the machine has been stopped.

The principal object of the invention is to provide a tool drive member for driving rotary tools having a pair of opposed flats formed at or near the end of the shank. For this purpose the tool drive member is provided with opposed tool drive elements located in a groove or channel which move outwardly under the action of centrifugal force when rotated, the elements being provided with tool engaging surfaces which move inwardly to engage the flats on the shank of the tool. The tool drive elements may be so arranged that although the tool engaging surfaces rotate the tool they do not actually grip it, whereby the tool is allowed a controlled amount of "float" during operation.

The invention consists of a rotatable tool drive member for a lap or like tool having two opposite flats formed on its shank comprising a circular block which in operation rotates about its axis, a groove extending across the block with its center intersecting the rotational axis, a pair of tool drive elements in the groove, each tool drive element having a tool engaging surface lying on one side of the rotational axis and a centrifugal weight lying on the other side of the axis, and springs to urge the centrifugal weights towards the rotational axis, whereby the tool engaging surfaces are separated to the maximum extent when the tool drive member is stationary and are moved towards each other to engage the flats on a tool when the centrifugal weights move apart under the action of centrifugal force during rotation.

There may be a centering device in the housing to engage a mating centering device formed at the end of the tool shank.

The tool drive elements may have mutually abutting stops, one on each tool drive element, so as to control the minimum gap between the opposed tool engaging faces of the tool drive elements. The tool drive elements may also be provided with further mutually abutting stops, one on each tool drive element, arranged to control the maximum gap between the opposed tool engaging faces of the tool drive elements.

Selected embodiments of the invention will now be described with reference to the accompanying drawings.

Figure 1:
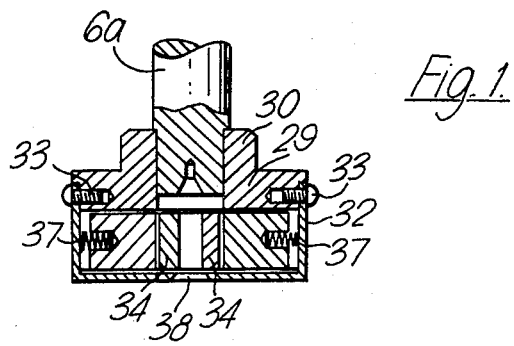
FIG. 1 is a sectional elevation of a form of tool drive member according to the invention having sliding drive elements.
Figure 2:
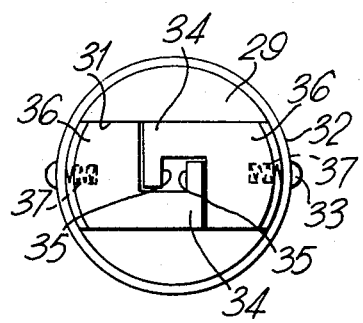
FIG. 2 is an inverted plan view of the tool drive member of FIG. 1.

The tool drive member shown in FIGS. 1 and 2 comprises a circular block 29 which has a boss at 30 at its top and is radially grooved or slotted at 31 in its underside, the center of the groove intersecting the rotational axis of the tool drive member. The boss and the block are centrally bored for the reception of the lower end of a drive shaft 6a, the said end being fixed to the boss. The block is reduced in diameter from its bottom face to a zone near its top; the reduced portion is snugly received in the top of a cup 32 fixed to the block by screws 33. Within the groove 31 are two tool drive elements 34 each having a tool-engaging surface 35 at one side of the axis of the tool drive element opposite to the side at which the tool-engaging surface of the other tool drive element is located. Each tool drive element is loaded at the said opposite side by a centrifugal weight 36 radially slidable in groove 31. When the tool drive member is not rotating the tool drive elements are held in the position shown in FIG. 2 by springs 37 entering recesses in the outer ends of the respective weights and thrusting against the bottoms of the recesses and the inner face of the cup. When the tool drive member is rotating the weights move away from each other in opposition to the springs and so cause the tool engaging surfaces 35 to approach each other. Hence a tool having opposed flats on its shank inserted into the tool drive member through a central opening 38 in the bottom of the cup 32 is rotated by the tool drive elements. When rotation of the tool drive member ceases, or nearly so, the springs separate the jaws and so permit the tool to be removed from the tool drive member.

Figure 3:
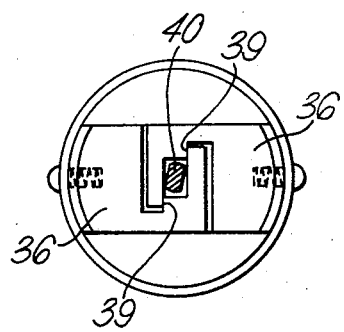
FIG. 3 shows a modification of the tool drive member of FIGS. 1 and 2.

An advantageous modification of the embodiment shown in FIGS. 1 and 2 is illustrated in FIG. 3. The general construction is similar to that of FIGS. 1 and 2 except that a shoulder 39 is incorporated on each tool drive element to limit the closing movement of the tool drive elements under centrifugal force. The tool shank is shown in position in FIG. 3, indicated by reference 40, and it is provided with two flats, the distance between the flats being slightly less than the distance between the opposed tool engaging faces of the tool drive elements when in the closed position. This enables the tool to float to a limited extent while still maintaining the rotational drive.

The difference between the width of the tool shank across the flats and the separation of the drive elements in the closed position is deliberately exaggerated in FIG. 3 in order to make the explanation clear. In the practical case the difference between the width of the tool shanks across the flats and the distance between the tool engaging faces in the closed position need only be sufficient to prevent actual gripping of the tool shank. That is to say, a few hundredths of a millimeter difference between the two dimensions would be sufficient to allow the desired clearance.

Figure 4:
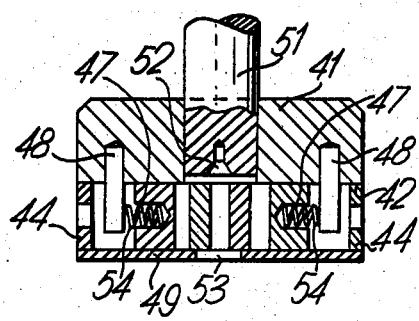
FIG. 4 shows a sectional elevation of another form of the tool drive member according to the invention.
Figure 6:
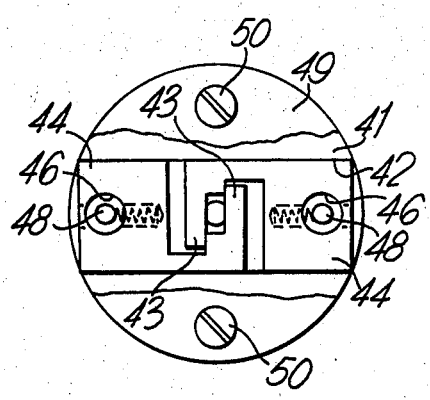
FIG. 6 is an inverted plan view of the tool drive member of FIG. 4 in the drive elements-closed (running) condition.
Figure 5:
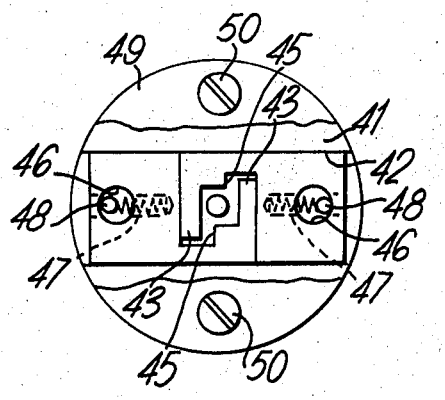
FIG. 5 is an inverted plan view of the tool drive member of FIG. 4 in the drive elements-open (stationary) condition.

FIGS. 4 to 6 show a particularly advantageous form of the tool drive member according to the invention. Referring to these Figures, the housing 41 is cylindrical and has a rectangular groove 42 diametrically across its center in which the two tool drive elements 43 with their integral centrifugal weights 44, may slide. The two tool drive elements are of the form shown in FIG. 3 having shoulders 45 which limit the inward movement so that a tool having flats cut on its shank of the appropriate across-flats width will be allowed a certain amount of float.

The two tool drive elements are formed with holes 46 from which blind bores 47 lead inwardly. Pins 48 project from the housing 41 into the holes 46 and springs 54 are engaged by the pins 48 at one end and abut the bottoms of the blind bores 47 at their other ends. The pins 48, engaging the diameters of the holes 46, limit the inward movement of the weights 44 and the outward movement of the drive elements 43. The sliding members are retained in the housing 41 by a cover plate 49 (partly cut away in FIGS. 5 and 6) which is secured by screws 50.

The housing 41 is bored to receive the end of a drive shaft 51 which is formed with an internal cone 52 which constitutes a centering device. The tool shank is formed with a mating centering device, so that the end of the shank, when fully entered into the tool drive member, is centered and the cover plate 49 has a central hole 53 to enable the shank of a tool to enter.

In the examples illustrated the bores for the reception of the lower ends of the respective drive shafts may be blind at their bottoms and the conical recesses for centering the tools may be in the lower ends of the material closing the said bores.

I claim:

1. A rotatable tool drive member for a lap or like tool having two opposite flats formed on its shank, comprising a circular block which in operation rotates about its axis, a groove extending across the block with its center intersecting the rotational axis, a pair of tool drive elements in the groove, each tool drive element having a flat tool engaging surface lying on one side of the rotational axis perpendicular to a radial line passing through the center of the surface and a centrifugal weight lying on the other side of the axis, springs to urge the centrifugal weights towards the rotational axis, and mutually abutting stops, one on each tool drive element, to control the minimum gap between the opposed tool engaging surfaces of the tool drive elements, so arranged that when the tool drive member is rotated the tool engaging surfaces move towards each other to engage the flats and rotate the tool without gripping it tightly so as to allow the tool a controlled amount of float during operation.

2. A member as claimed in claim 1 comprising a centering device in the housing to engage a mating centering device formed at the end of the tool shank in order to center the end of the tool shank while still allowing a controlled amount of float in the tool.

3. A member as claimed in claim 1 comprising further mutually abutting stops, one on each tool drive element, arranged to control the maximum gap between the opposed tool engaging faces of the tool drive elements.

* * * * *